Sept. 3, 1963 KATSUYA ATSUMI 3,102,698

AUTOMATIC STOP MECHANISM FOR TAPE RECORDERS AND THE LIKE

Filed Dec. 22, 1961 2 Sheets-Sheet 1

INVENTOR.
KATSUYA ATSUMI
BY [signature]
ATTORNEY

Sept. 3, 1963 KATSUYA ATSUMI 3,102,698
AUTOMATIC STOP MECHANISM FOR TAPE RECORDERS AND THE LIKE
Filed Dec. 22, 1961 2 Sheets-Sheet 2

INVENTOR.
KATSUYA ATSUMI
BY [signature]
ATTORNEY

United States Patent Office 3,102,698

Patented Sept. 3, 1963

3,102,698

AUTOMATIC STOP MECHANISM FOR TAPE RECORDERS AND THE LIKE

Katsuya Atsumi, 883 3-chome, Kohjiya-cho, Ohta-ku, Tokyo, Japan

Filed Dec. 22, 1961, Ser. No. 161,733

12 Claims. (Cl. 242—55.12)

This invention relates to an automatic stop mechanism for magnetic tape recorders.

Such stop mechanism is known per se and various constructions therefor have been proposed.

The main object of the invention is to provide a stop mechanism of the kind referred to above, which is capable of stopping the running tape when the tension therein should considerably decrease or cease completely by some cause such as breakage, termination or the like of the recording or recorded tape, while keeping all other mechanism ready for re-recording or replaying back, as the case may be. This feature is also applicable to the case of high-speed winding up or feeding.

For this purpose, an eccentric gear is provided in the proximity of a conventional capstan or driving gear. This gear is provided on its periphery with a recess or mutilated gear section. By the provision of this recess, the eccentric gear is normally kept out of engagement with the driving gear. On the other hand, a feeler is kept in contact with the running tape and should the tension thereof be reduced considerably or cease completely, the feeler actuates the eccentric to turn in one direction to a degree enough to engage the capstan or driving gear, whereby said eccentric gear will be positively driven substantially a complete revolution, until the said recess will have again been brought into registration with the capstan gear.

According to this invention, this rotational movement of the eccentric gear is utilized to actuate a plurality of mechanisms for disengaging the tape drive and actuating brake means for both the feed spool and the takeup spool and returning a conventional function control switch of the tape recorder for the high speed feed and rewind control, while other operating mechanisms are kept in ready state for continued operation. The above mentioned turning movement of the eccentric gear may be, if necessary, utilized to switch off the current supply source from the machine.

Various further and more specific objects, features and advantages of the invention will appear from the description given below, taken in connection with the accompanying drawings illustrating by way of example a preferred embodiment of this invention.

Figure 1:
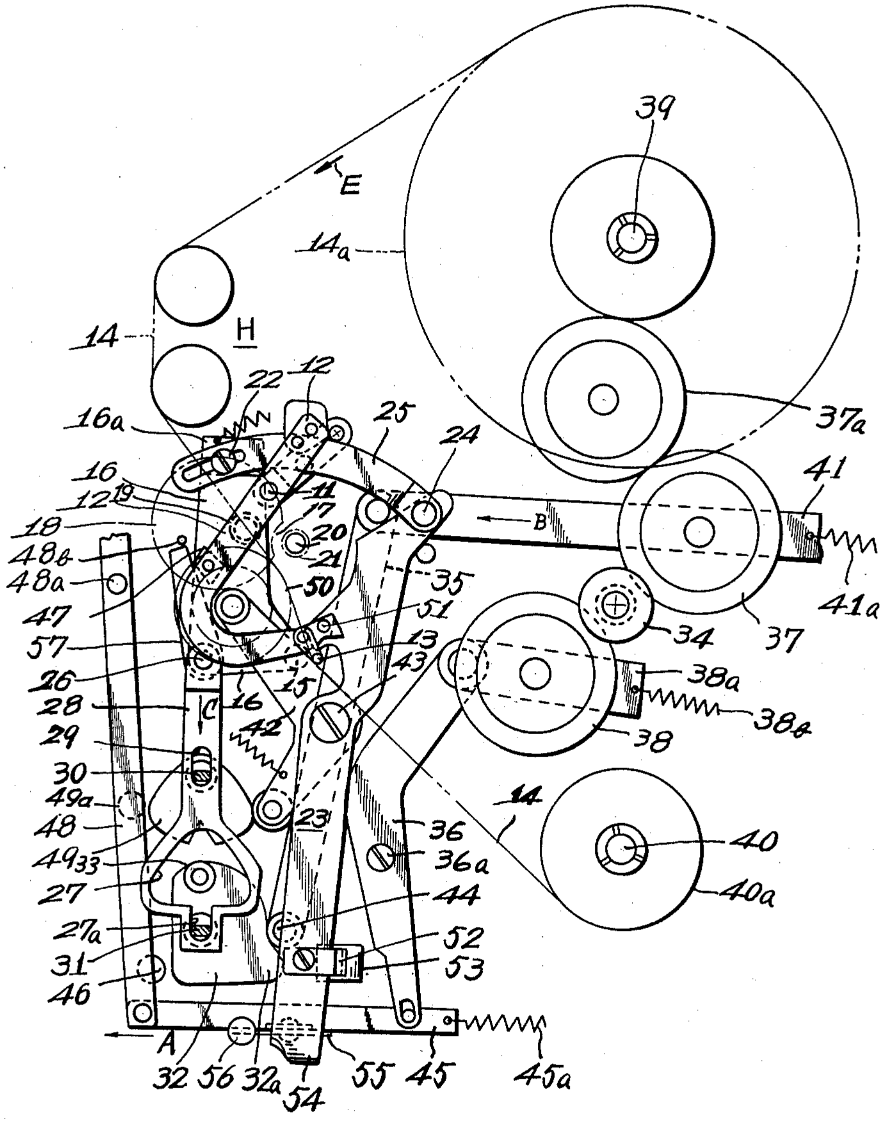
FIG. 1 is a top plan view of an automatic stop mechanism according to the invention, wherein however a chassis for mounting the mechanism has been omitted for simplification.
Figure 2:
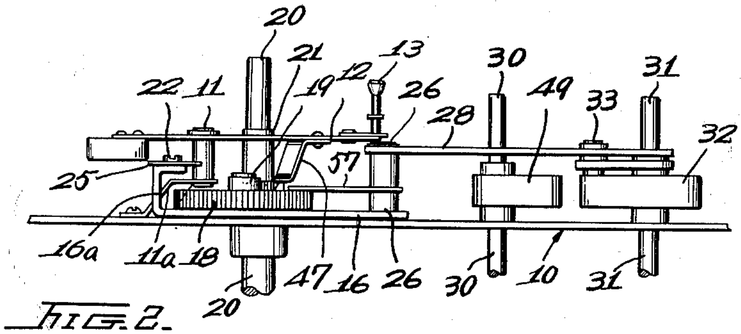
FIG. 2 is a side view thereof.

In the drawings, a substantially hook-shaped lever 12 is pivotally mounted at an intermediate point adjacent to one end thereof on a pivot 11, which is in turn fixedly supported through a support 11*a* on a chassis 10 as illustrated partly in FIG. 2. At the opposite end of the said lever 12, a feeler pin 13 is mounted and normally kept in contact with a magnetic tape, which is illustrated in FIG. 1 schematically by the dot-dash line 14 and shown as supplied from a feed spool or reel 14*a* illustrated diagrammatically. The advancing direction of the tape is shown in the same figure by a small arrow E. It will be seen that the tape is kept in sliding contact with a conventional head assembly H arranged alongside the path extending between the feed spool 14*a* and the feeler 13. A rocker plate 16 is provided with a pivot 15 fixed at one of the corners of said plate, said pivot being rotatably mounted in the chassis 10, although not shown. A toothed wheel or eccentric gear 18 having a recess or mutilated gear section 17 is eccentrically mounted on the rocker plate 16 by means of a pivot 19 and adapted to cooperate with a driving gear or pinion 21 mounted on a capstan spindle 20, as more clearly shown in FIG. 3. The opposite end of the rocker 16 is shaped in a channel section as at 16*a* and connected adjustably with an elongated emergency brake lever 23 at its one end by way of an arc-shaped connecting rod 25, which is held in position by means of a set screw 22 and a pivot pin 24. The rocker plate 16 is pivotally connected at its one corner 26 opposite to the pivot 15 with one end of a further lever 28, the opposite end of which is shaped to form an enlarged eye 27. The lever 28 is formed at its intermediate portion with a slot 29, through which passes the stem 30 of a conventional control switch for recording and playback, the control knob and switch gear thereof being omitted for simplification. The extreme end of said eye 27 is formed into a slot 27*a*, through which extends the stem 31 of a conventional three-way control switch for quick winding, neutral and re-winding, the operating knob attached thereto and the switch gear thereof being again omitted for simplification. A cam 32 is fixed on said stem 31 and a follower roller 33 is rotatably mounted on said cam, said roller serving to limit the operating range of the second control switch by engagement with the corner wall portions of said enlarged eye opening 27, as will be more clearly seen from FIG. 3.

A main drive shaft 34 is driven for instance in the counterclockwise direction by drive motor (not shown) directly coupled to the lower end thereof. Idler wheels 37 and 38 are shiftably mounted in the neighborhood of the drive shaft and may be brought into engagement therewith, respectively by the actuation of associated operating levers 35 and 36, in accordance with conventional technique. When the idler 37 is brought into contact with the drive shaft 34, a supply reel spindle 39 is brought into driving connection with the drive shaft 34 through the intermediary of wheels 37*a* and 37. In the similar manner, when the idler 38 is brought into operative engagement with the drive shaft 34, the idler is caused simultaneously to contact with a take-up reel spindle 40, whereby motion will be transmitted therefrom to the spindle in the conventional manner. Idler wheel 37 is rotatably mounted on a support bar 41, which is pivotally connected at its one end with a rocker lever 35. The latter is pivotally mounted at its intermediate portion on a common pivot 43 for the brake lever 23 and a pinch or pressure roller arm 42. Rocker lever 35 is provided at its opposite end with a follower roller 44 and kept in resilient contact with the cam 32 under the influence of a tension spring 41*a* attached to the wheel carrying end of the bar 41. In the proximity of the opposite side of the cam 32 is arranged a further follower roller 46, which is mounted on a rocker lever 48. This lever is pivoted at 48*a* and connected at its one end with a connecting rod 45 which is provided at its opposite end with a tension spring 45*a*. In the proximity of this spring, the rod 45 is pivotally connected with a rocker arm 36 which is pivotally supported as at 36*a* and linked to a further rod 38*a*, which rotatably supports the rubber idler 38, a tension spring 38*b* urging the last mentioned rod to move in the upward direction in FIG. 1. These related parts are so arranged that when the switch shaft 31 is turned a predetermined angle in the clockwise direction the cam 32 acts upon the follower 46 to move in the direction as illustrated by the arrow A in the same figure, whereby the idler 38 is brought into operative contact with both the upper most larger diameter portion of drive shaft 34 and the disc 40*a* of take-up spindle 40, provided that the brake lever 23 is kept in its inoperative position. As a consequence, the fast winding operation will be caused to take place. In this case, the roller 33 occupies the one extreme position as shown by full line in FIG. 3. On the conrtary, when the switch shaft is turned a definite angle in the counter-clockwise direction until the roller 33 is brought to the opposite extreme position, the rocking arm 35 is caused to rotate about about its pivot 43 in the counter-clockwise direction, as indicated by the arrow B, by virtue of the cooperation of the follower 44 with the cam portion 32*a*, so that motion is transmitted from the drive shaft 34 through the idlers 37 and 37*a* to the supply spool shaft 39 for actuation thereof to rewind the tape at a high speed.

If the tension in the tape 14 should be considerably reduced or should disappear due for instance to a tape breakage or the termination thereof, the force acting upon the feeler 13 from the tape will be substantially or completely released, thereby causing the lever 12 to rotate about its pivot 11 in the clockwise direction by the action of spring means not shown. By virtue of this turning movement, a blade member or pusher 47 depending from the lever 12 will act upon a pin 48*b* fixed on the wheel 18 which is thus caused to rotate in the direction shown by an arrow D, FIG. 3, to a degree sufficient to be brought into engagement with the capstan or driving gear 21, which has been idling by virtue of recess 17 (FIG. 1). Upon engagement in this manner, the wheel 18 is caused to turn eccentrically through substantially a complete revolution in the clockwise direction, since the capstan gear 21 together with capstan spindle 10 are turning in the counterclockwise direction. As a consequence the pivot 26 moves at first downwards in FIGS. 1 and 3 and then upwards to the original position shown in FIG. 1. In other words, the rocker plate 16 is first caused to rotate about its pivot 15 in the counterclockwise direction and then in the opposite direction. It will be clear that in this case, the lever 28 linked to rocker 16 is caused to advance downwardly in the drawing as indicated by an arrow C and then to return in the opposite direction. By the first advancing stroke, follower roller 33 is urged to move inwards to the central position, whereby the switch stem 31 is caused to return to its neutral or shut-off position.

When a cam 49 attached to the first stem 30 is rotated in the clockwise direction by manipulating the stem, pinch roller 50 is brought into operative engagement with the capstan 20 by way of lever arm 42, while the idler wheel 38 is also brought into contact (through 49*a*) with both the drive spindle 34 and take-up spool 40*a*, which is shown as the take-up spindle disc for simplicity in the drawing, thus providing the possibility of recording or playing back at a lower speed, in accordance with conventional technique. Also it this case, when the tape should be loosened for one or another reason, the toothed wheel 18 will be rotated as before and then the rocker 16 will draw the linked end of brake lever 23, resulting in a tongue 51 on lever 23 to actuate the pinch roller arm 42 so as to bring the pinch roller 50 out of engagement with the cooperating capstan 20, while an actuator 52 depending from the brake lever 23 acts upon lever 36 so as to turn in the clockwise direction for disengagement of idler 38 from the take-up spool 40*a* which then comes into engagement with a stationary stop 53 as shown by the dot-dash lines in FIG. 4. At the same time, the brake lever 23 operates conventional brake means so as to stop the feed—and the take-up shafts 39 and 40. It will thus be seen that in this case the tape 14 is caused to stop, while the machine is maintained either in its play-back or recording condition. The brake mechanism for arresting the shafts 39*a* and 40*a*, upon emergency decoupling of either the feed or take-up spools during rapid forward or re-winding, or during the recording and playback operations, may be of any conventional construction, such as shown schematically and by way of example in FIG. 5. In the latter, the arcuate connecting link 25, moving initially in the direction of the arrow *a* as a result of breakage of the tape 14, in the manner described, rotates the brake lever 23 in counterclockwise direction about its pivot 43, whereby in turn to displace a rockshaft 60 towards the right, as indicated by the arrow *b* in the drawing. As a consequence, the bellcrank lever 61 having a fixed pivot 62 and being linked with one arm to the shaft 60 is rotated anticlockwise, thereby to cause a brake shoe 63 carried by the remaining arm of said lever to engage the shaft 40*a* of the take-up spool and to arrest the same substantially instantly, in a manner readily understood. At the same time, the rockshaft 60 rotates a double lever 64 having a pivot 65 and one arm linked to said shaft, in such a manner as to displace a further rockshaft 67 linked to the opposite arm of said double lever in the direction as indicated by the arrow *c* in the drawing. This, in turn, causes rotation of the further bellcrank lever 68 having a fixed pivot 69 and one arm linked to the shaft 67, thereby to operate the remaining arm of lever 68 and with it a brake shoe 70 into engagement with the shaft 39*a* of the feed spool, to arrest the latter in the same manner as the take-up spool is arrested by the lever 61. In this position, the mechanism is locked by the stop 52 on lever 23 engaging the fixed stop 53. Release of the brakes 63 and 70 may be effected by actuation of the pushbutton or control knob 56, FIG. 1, in the manner described.

Figures 3, 4:
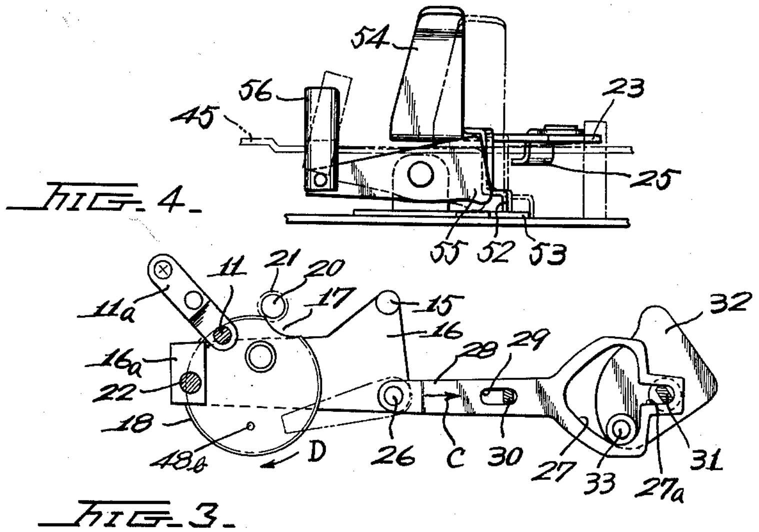
FIG. 3 is a detail view of a part of FIG. 1, illustrative of the working mode of several constituent parts.
FIG. 4 is an enlarged fragmentary end view of the tape recorder mechanism, seeing from the right hand side of FIG. 1.
Figure 5:
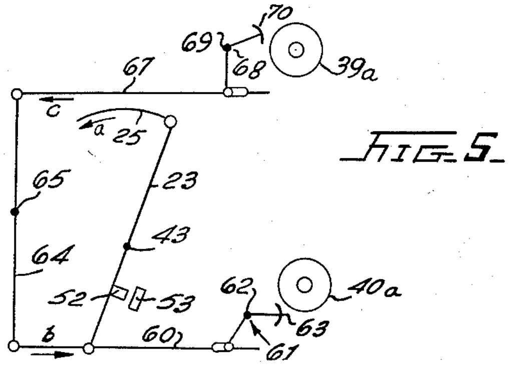
FIG. 5 is a diagrammatic view of the invention.

When it is desired to release the tape from the stoppage position established in the manner described, a push button 56 is depressed so as to rotate a lever 55 to rotate counterclockwise in FIG. 4, thereby moving the related end 54 of brake lever 23 upwardly, enough to disengage the actuator 52 from the stop 53, as illustrated by full lines in FIG. 4. The brake lever 23 is then automatically turned clockwise under the influence of spring means (not shown) to its off-brake position shown in FIG. 1. At the same time the released lever 36 is caused to turn clockwise about its pivot 36*a* under the influence of the tension spring 38*b* so that both idler 38 and pinch roller 50 return to their operative position.

For the prevention of reverse rotation of the toothed wheel 18, a checker 57 is provided so as to cooperate with the pin 48*b*, should the wheel turn in the counterclockwise direction. The checker may, however, escape, as in the case of the pusher blade 47, from its operative position, when the wheel is caused to turn clockwise as above mentioned, since the pusher is mounted pivotably and normally held in its operative position by a spring and a stop, although not shown.

It will be clear from the foregoing that a sudden release of tension on the tape 14 should happen to take place by a certain cause such as tape breakage, tape termination or the like during either the recording or playing back operations, the emergency stop lever may be instantly and automatically brought into operation to stop the running tape. It is obvious to any person skilled in the art to arrange the above mentioned stop mechanism to simultaneously shut-down the current source. A careless play-back running of the tape recorder overnight, for instance, without noticing the termination of the tape, can be thus effectively prevented by the emergency stop mechanism constructed according to the invention.

It will be understood that modifications and variations disclosed herein may be resorted to without departing from the scope of the concepts of the present invention. Therefore, the scope of the invention should be limited only by the scope and proper interpretation of the claims appended hereto.

What I claim as new and desire to protect by Letters Patent is:

1. Automatic stop mechanism for magnetic tape recorders and the like including a tape, a feed spool and take-up spool, said mechanism comprising in combination: a feeler kept in contact with said tape and urged resiliently to turn in a certain direction; a driving gear; an eccentric gear normally kept in disengagement from said driving gear, means to operate said gears into meshing engagement by and upon pivotal movement of said feeler; brake means for both said feed and take-up spools an emergency stop lever linked to both said brake means for stopping both said feed spool and a take-up spool; a rocker plate actuated by said eccentric gear; linkage means operatively connected between said rocker plate and said stop lever; a locking means for positioning said stop lever in its braking position; said stop lever being brought into its operating position upon rotation of said eccentric wheel and through said rocker plate and said linkage for actuation of said brake means.

2. Automatic stop mechanism for magnetic tape recorders and the like including a tape, a feed spool and a take-up spool, said mechanism comprising in combination: a feeler kept in contact with said tape and urged resiliently to turn in a certain direction; a driving gear, an eccentric gear normally kept in disengagement from said driving gear, means to operate said gears into meshing engagement by and upon pivotal movement of said feeler by virtue of loosened tension in said tape; a rocker plate actuated by said eccentric gear; a function control switch for said recorder a cam-and-roller arrangement rigidly connected with said function control switch; connecting means in operative connection with both said rocker plate and said cam-and-roller arrangement when said control switch is brought into its operating position, thereby to return said switch from its operating to its non-operating position when the tension in the tape is reduced considerably.

3. Automatic stop mechanism for magnetic tape recorders and the like including a tape, a feed spool and a take-up spool, said mechanism comprising in combination: a feeler kept in contact with said tape and urged resiliently to turn in a certain direction; a driving gear, an eccentric gear having a recess on its peripheral surface and normally being kept in disengagement from said driving gear and registering with said recess and caused to be engaged therewith by and upon pivotal movement of said feeler upon occurrence of considerably loosened tension in said tape; brake means for both said feed and take-up spools; an emergency stop lever linked to both said brake means for stopping both said feed gear and take-up spools, a rocker plate actuated by said eccentric gear; linkage means operatively connected to said stop lever; a locking means for positioning said stop lever in its braking position; a function control switch for said recorder a cam-and-roller arrangement rigidly connected with said function control switch; connecting means kept in operative connection with both said rocker plate and said cam-and-roller arrangement when said control switch is brought into its operating position, whereby said stop lever is operated into its operating position upon rotation of said rocker plate and said linkage for actuation of said brake means and simultaneously said switch is returned from its operating to its non-operating position.

4. Automatic stop mechanism for magnetic tape recorders and the like including a tape, a feed spool and a take-up spool, said mechanism comprising in combination: a feeler kept in contact with said tape and urged resiliently to turn in a certain direction; a driving gear; an eccentric gear normally kept in disengagement from said driving gear, and cause to become engaged therewith by and upon pivotal movement of said feeler upon occurrence of considerably loosened tension in said tape; brake means for both said feed and take-up spools; an emergency stop lever linked to brake means for stopping both said feed and take-up spools; a rocker plate actuated by said eccentric gear; linkage means operatively connected between said rocker plate and said stop lever; a locking means for positioning said stop lever in its braking position; locking means for keeping said stop lever in its operating position; and a manually operative release means for releasing said stop lever from its locked position to its normal non-operating position; said stop lever being brought into its operating position upon rotation of said eccentric gear through said rocker plate and said linkage for actuation of said brake means kept in braking position by said locking means.

5. In combination with a moving tape, a first reel carrying said tape, a second reel, drive means and adjustable coupling means for connecting said second reel with and disconnecting it from said drive means, for winding said tape from said first reel upon said second reel, release mechanism comprising a lever having a stationary pivot at one end and carrying a feeler at its opposite end engaging said tape in the tensioned condition during a winding operation, a rocker plate having a stationary pivot, a first continuously driven gear, a second gear for cooperation with said first gear being eccentrically rotatably mounted upon said plate and having a relatively small peripheral multilated gear section positioned normally relative to said first gear close to the position of meshing engagement of said gears, actuating means upon said lever and said second gear cooperatively related such as to operate said second gear into meshing engagement with said first gear by said lever being deflected upon cessation of the tape tension upon said feeler, whereby to rotate said second gear through a full revolution and to operate said plate through a predetermined oscillating path, and means controlled by said plate to actuate said coupling means, whereby to interrupt driving connection between said drive means and said second reel.

6. In release mechanism as claimed in claim 5, adjustable braking means for said second reel, and means to control said braking means by said plate, to substantially instantly arrest rotation of said second reel upon disconnection from said driving means by said plate.

7. In combination with a moving tape arranged for unwinding from a first reel and winding upon a second reel, and vice versa, drive means, adjustable coupling means for selectively establishing driving connection between either of said reels and said drive means, release mechanism comprising a lever having a stationary pivot at one end and carrying a feeler at its opposite end engaging said tape in the tensioned condition during a winding operation, a rocker plate having a stationary pivot, a first continuously driven gear, a second gear for cooperation therewith being eccentrically rotatably mounted upon said plate and having a relatively small peripheral mutilated gear section positioned normally relative to said first gear close to the point of meshing engagement of said gears, actuating means upon said lever and said second gear cooperatively related such as to operate said second gear into meshing engagement with said first gear by said lever being deflected upon cessation of the tape tension upon said feeler, whereby to rotate said second gear through a full revolution and to operate said plate through a predetermined oscillating path, and means controlled by said plate to actuate said coupling means, to interrupt connection of the driven reel from said drive means.

8. In release mechanism as claimed in claim 7, adjustable braking means for both said reels, and means to control said braking means by said last-mentioned means, to arrest said reels substantially instantly upon decoupling from said drive means of the driven reel by said plate.

9. In combination with a moving tape, drive means to unwind said tape from a supply reel upon a take-up reel, control means operable between a zero and an operative position to establish and disestablish winding movement of said tape, respectively, release mechanism comprising a lever having a stationary pivot at one end and carrying a feeler at its opposite end engaging said tape in the tensoined condition during a winding operation, a rocker plate having a stationary pivot, a first continuously driven gear, a second gear for cooperation therewith being eccentrically rotatably mounted upon said plate and having a relatively small peripheral multilated gear section positioned normally relative to said first gear close to the position of meshing engagement of said gears, actuating means upon said lever and said second gear cooperatively related to operate said second gear into engagement with said first gear by said lever being deflected upon cessation of tape tension upon said feeler, whereby to rotate said second gear through a full revolution and to operate said plate through a predetermined oscillating path, and means operated by said plate to return said control means to zero position, to arrest the winding movement of said tape.

10. In combination with a tape recorder having a supply reel and a take-up reel, drive means, adjustable coupling means for coupling said supply reel with said drive means for rewinding of said tape from said take-up reel, a drive capstan and adjustable pressure roller to drive said tape during recording and playback by unwinding from said supply reel and winding upon said take-up reel, independent control means for both said roller and said coupling means to establish and disestablish driving connection between said tape with said capstan drive and between said drive means and said take-up reel, respectively, release mechanism comprising a spring-loaded lever having a stationary pivot at one end carrying a feeler at its opposite end resiliently engaging said tape in its tensioned condition during a recording, playback or rewinding operation, a rocker plate having a stationary pivot, a capstan gear, a further gear for cooperation therewith being eccentrically rotatably mounted upon said plate and having a relatively small peripheral mutilated gear section position normally relative to said capstan gear close to the position of meshing engagement of the gears, actuating means upon said lever and said further gear to operate said further gear into meshing engagement with said capstan gear by said lever being deflected upon cessation of the tape tension upon said feeler, whereby to rotate said further gear through a full revolution and to operate said plate through a predetermined oscillating path, braking means for said take-up reel, means to establish driving connection of said take-up reel with said drive means, and further means controlled by said plate to actuate said control means, said braking means and said roller, to disestablish driving connection of said tape and of said take-up reel.

11. In combination with tape recorder having a supply reel and a take-up reel, drive means, first and second adjustable coupling means for selectively coupling said take-up reel and said supply reels with said drive means, for rapid winding and rewinding of said tape, respectively, first control means for both said first and second coupling means having a neutral position and winding and unwinding positions, respectively, a drive capstan and adjustable pressure roller to drive said tape during recording and playback by unwinding from said supply reel and winding upon said take-up reel, second independent control means for both said roller and said first coupling means to establish and disestablish driving connection between said tape and said capstan and between said drive means and said take-up reel, respectively, release mechanism comprising a spring-loaded lever having a stationary pivot at one end and carrying a feeler at its opposite end resiliently engaging said tape in its tensioned condition during a recording, playback or rewinding operation, a rocker plate having a stationary pivot, a capstan gear, a further gear for cooperation therewith being eccentrically rotatably mounted upon said plate and having a relatively small peripheral mutilated gear section positioned normally relative to said capstan gear close to the position of meshing engagement of said gears, actuating means upon said lever and said further gear to operate said further gear into meshing engagement with said capstan gear by said lever being deflected upon cessation of the tape tension upon said feeler, whereby to rotate said further gear through a full revolution and to operate said plate through a predetermined oscillating path, braking means for said supply and take-up reels, means controlled by said plate to actuate said braking means and said coupling means, to disestablish driving connection of said reels, and further means also controlled by said plate to actuate said second control means to disestablish driving connection of said tape and said take-up reel.

12. In a tape recorder as claimed in claim 10, resetting means to release and return said braking means to starting position.

No references cited.